United States Patent [19]
Small

[11] Patent Number: 6,040,870
[45] Date of Patent: *Mar. 21, 2000

[54] METHOD AND APPARATUS FOR NESTING SECONDARY SIGNALS WITHIN A TELEVISION SIGNAL

[75] Inventor: David Small, San Jose, Calif.

[73] Assignee: Shoot the Moon Products, Inc., Pleasanton, Calif.

[*] Notice: This patent is subject to a terminal disclaimer.

[21] Appl. No.: 09/153,098

[22] Filed: Sep. 14, 1998

Related U.S. Application Data

[63] Continuation of application No. 08/523,848, Sep. 5, 1995, Pat. No. 5,808,689, which is a continuation of application No. 08/230,490, Apr. 20, 1994, abandoned.

[51] Int. Cl.⁷ .............................. H04N 7/08; H04N 7/04
[52] U.S. Cl. .......................... 348/476; 348/474; 348/434
[58] Field of Search .................... 348/460–468, 348/473, 474, 432, 434; H04N 7/08, 7/04

[56] References Cited

U.S. PATENT DOCUMENTS

| | | |
|---|---|---|
| 3,423,520 | 1/1969 | Kelly . |
| 3,825,674 | 7/1974 | Justice . |
| 3,849,594 | 11/1974 | Justice . |
| 3,857,998 | 12/1974 | Justice et al. . |
| 3,902,007 | 8/1975 | Justice . |
| 3,916,092 | 10/1975 | Justice . |
| 4,156,253 | 5/1979 | Steudel . |
| 4,191,969 | 3/1980 | Briand et al. . |
| 4,233,627 | 11/1980 | Sugihara . |
| 4,295,223 | 10/1981 | Shutterly . |
| 4,318,125 | 3/1982 | Shutterly . |
| 4,429,332 | 1/1984 | Pargee, Jr. . |
| 4,535,356 | 8/1985 | Nakagawa et al. . |
| 4,542,406 | 9/1985 | Shimoyama et al. . |
| 4,618,889 | 10/1986 | Berde et al. . |
| 4,652,919 | 3/1987 | Devino . |
| 4,656,512 | 4/1987 | Devino . |
| 4,665,431 | 5/1987 | Cooper . |
| 4,780,757 | 10/1988 | Bryer et al. . |
| 4,780,758 | 10/1988 | Lin et al. . |
| 4,783,699 | 11/1988 | DePaul . |
| 4,786,967 | 11/1988 | Smith, III et al. . |
| 4,807,031 | 2/1989 | Broughton et al. . |
| 4,816,905 | 3/1989 | Tweedy et al. . |
| 4,851,909 | 7/1989 | Noske et al. . |
| 4,855,827 | 8/1989 | Best . |
| 4,983,967 | 1/1991 | McKenzie . |
| 5,061,988 | 10/1991 | Yasuki et al. . |
| 5,075,773 | 12/1991 | Pullen et al. ............................ 348/473 |
| 5,091,936 | 2/1992 | Katzenelson et al. . |
| 5,278,649 | 1/1994 | Naimpally . |
| 5,309,235 | 5/1994 | Naimpally . |
| 5,808,689 | 8/1998 | Small ..................................... 348/476 |

FOREIGN PATENT DOCUMENTS 0156709A  5/1985  European Pat. Off. .

Primary Examiner—Michael H. Lee
Attorney, Agent, or Firm—Blakely, Sokoloff, Taylor & Zafman LLP

[57] ABSTRACT

A method and apparatus is disclosed for encoding secondary signals, such as audio signals, within a television signal in a manner such that the signal may be either recorded on a video cassette or broadcast. The audio samples are encoded only on selected lines of each video frame which do not interfere with dedicated broadcast and cable lines and are not affected by head switching of a video cassette recorder. The audio samples are encoded only within an overscan portion of the selected lines such that the encoded samples do not interfere with other portions of the video signal. However, by encoding the samples within the overscan portion, the samples do not affect the displayed image. The secondary audio signal is sampled during equally spaced intervals throughout the video frame, then compressed and encoded only within selected horizontal lines. During decoding, the audio samples are decompressed and played back at the original sampling rate to provide audio playback

19 Claims, 7 Drawing Sheets

METHOD AND APPARATUS FOR NESTING SECONDARY SIGNALS WITHIN A TELEVISION SIGNAL

This application is a continuation of application Ser. No. 08/523,848, filed Sep. 5, 1995 issued into U.S. Pat. No. 5,808,689, which is a continuation of application Ser. No. 08/230,490 filed Apr. 20, 1994, which is now abandoned.

BACKGROUND OF THE INVENTION

1. Field of the Invention

The invention generally relates to television signals and in particular to a method and apparatus for nesting or encoding secondary signals, such as audio signals, within a television signal.

2. Description of Related Art

For certain television applications it is desirable to nest or encode secondary signals, such as audio signals, within a television signal. One such application involves interactive television toys wherein a teddy bear or other toy receives television signals provided by a VCR for display on a television set and extracts and responds to secondary signals nested within the television signal.

Typically, a control module is interconnected between the VCR and the television set. Preprogrammed video cassettes having television programs containing the nested signals are played using the VCR. The television signal is intercepted by the control module and nested audio signals, as well as various nested control signals, are extracted. The control module transmits the extracted signals to the teddy bear or other toy which includes internal mechanisms and circuitry for movement and speech. The teddy bear receives the extracted audio signals and plays back the audio signals while also moving in synchronization.

The entire television signal, including the nested audio signals, is transmitted from the control module into the television set which displays the prerecorded television program. The audio and control signals are nested or encoded within the television signal in a manner such that the television does not respond to, and is not affected by, the presence of the nested signals. Typically, the audio and control signals nested within the television signal are synchronized to portions of the television program such that the teddy bear or other toy appears to interact with characters and events displayed on the television set within the television program.

To implement such a system, the secondary voice and control signals are encoded within a portion of the television signal such that the secondary signals can be extracted from the television signal, yet such that the television itself does not respond to, and is not affected by, the presence of the secondary signals. A number of such techniques have been developed. Typically, portions of the television signal which do not provide video, audio or control signals to the television set are selected and secondary signals are encoded therein.

One example of such a technique is set forth in U.S. Pat. No. 4,665,431 to Cooper, wherein amplitude modulated audio samples are encoded on the "back porch" of a horizontal blank interval of a television signal. Although the method of Cooper may be effective for certain applications, it is not particularly effective for encoding signals within a television program recorded on a video cassette due to band-width limitations in consumer grade VCR's.

Another example of a technique for encoding signals within a television signal is set forth in U.S. Pat. No. 3,857,998 to Justice wherein secondary audio signals are encoded within a television signal using a chroma carrier of the television signal. In the technique of Justice, the secondary audio signals are encoded on a blanked portion of the back porch of the horizontal blanking interval. The vertical blanking interval of the television signal is not encoded. Because all of the lines of each video frame are not encoded with secondary audio signals, a problem arises in providing a continuous output of the secondary audio signal as the encoded signals are extracted from the television signal. To overcome this problem, and to provide a continuous audio output, all audio samples, except for those which would otherwise be nested within the lines containing the vertical blanking intervals, are delayed by a predetermined amount. Those signals which would otherwise be nested within the vertical blanking intervals are stored at different locations within the television signal and are not delayed. During the decoding of the secondary audio signals, delayed and non-delayed audio samples are recombined to recreate a continuous audio signal.

Although the method of Justice is useful for nesting secondary signals within a television program for playback on a VCR, it may not be easily applied to television signals which are broadcast because the secondary signal is stored at locations within the television signal which contains dedicated broadcast-related control signals during broadcast. Thus, the technique of Justice cannot be easily applied to providing nested signals for controlling the teddy bear or toys of the type described above wherein the television program is broadcast rather than stored on a video cassette. As can be appreciated, there is considerable advantage to providing such programs via broadcast television rather than on prerecorded video cassettes, with the greatest advantage perhaps being the diversity and variety of programming material that can be conveniently provided via broadcast television.

Another technique for encoded audio signals is described in U.S. Pat. No. 4,786,967 to Smith. In the technique of Smith, as with the technique of Justice, secondary audio samples are not stored within the vertical blanking lines. However, unlike Justice, the audio samples which would otherwise be stored within those vertical blanking lines are not stored elsewhere. A discontinuity results from the lack of audio samples stored in the vertical blanking signals. The discontinuity results in a 60-cycle hum during playback. Furthermore, higher-order harmonics based on the 60-cycle hum may also be present which further undesirably distort the output audio signal. With the technique of Smith, the 60-cycle hum problem is addressed by tapering the encoded audio signal to silence adjacent to the vertical blanking interval. In other words, rather than storing secondary audio samples at their full value throughout the horizontal portion of the signal, the magnitude of the audio signals are tapered at opposing ends of the horizontal portion such that the secondary audio signal is reduced to silence at the transition times from the display portion to the vertical blanking intervals. By tapering the audio signal, the 60-cycle hum generated during playback is reduced. Furthermore, the higher-order harmonics resulting from a sharp transition from no audio signal to a full audio signal are likewise reduced.

Although the technique of Smith may be effective in eliminating the 60-cycle hum problem without requiring the complicated delaying and recombination techniques of Justice, the technique of Smith may not be satisfactory for broadcast television signals. One reason that the technique of Smith may not be satisfactory for broadcast signals is that network and cable broadcasters impose limitations and constraints which prevent the encoding of audio signals within all of the video lines of the horizontal portion of the television signal. In particular, twenty-two lines of the video signal cannot be encoded due to such restrictions. The twenty-two lines which cannot be encoded represent over eight percent of the overall video signal. The lack of an audio signal within those twenty-two lines results in an audible 60-cycle hum and may further result in higher-order harmonics as well. Moreover, even if the technique of Smith were modified to also provide tapering in the vicinity of the twenty-two restricted lines, such a tapering would, at best, only be partially successful in eliminating the 60-cycle hum and higher-order harmonics.

Accordingly, it would be desirable to provide a technique for nesting secondary audio signals, as well as other secondary signals, within a television signal in a manner such that the encoded television signal may be broadcast, rather than merely provided by a video cassette recorder, and wherein 60-cycle hum and higher-order harmonic problems described above are substantially eliminated. The ability to provide broadcast television signals with nested audio and control signals is particularly desirable as a far greater variety of such programs can be provided conveniently to the customer than can be provided on video cassettes.

Although the audio nesting technique has been described above primarily with reference to the application of an interactive teddy bear or toy, encoded audio and control signals may be employed for a wide range of applications for controlling a wide range of devices, and are not limited to merely toys or other entertainment devices.

SUMMARY OF THE INVENTION

The invention relates to a method and apparatus for encoding or nesting secondary signals, such as audio signals, within a television signal, wherein the television signal may be either broadcast or stored on video cassettes and wherein 60-cycle hum problems associated with prior art techniques are avoided. In accordance with one aspect of the invention, the secondary signals are encoded using amplitude modulation within a non-visible overscan portion of a television signal. The non-visible overscan portion of the television signal represents a small portion of the otherwise viewable portion of the television signal which is effectively clipped from the peripheral portions of a television screen during display. More specifically, a standard television signal provides a generally rectangular video display portion. However, conventional television sets do not display the entire rectangular video portion. Rather, conventional television sets display most of the rectangular display portion but clip portions of the display on the left, right, top and bottom of the rectangular display area. The portion which is not displayed is generally referred to as the "overscan" portion. The overscan portion is provided so that a viewer sees a complete visible image and does not see any black blanking bars along the edges of the screen regardless of the electrical characteristics of a particular television set.

By encoding or nesting the secondary signals, such as audio signals, within the overscan portion, the secondary signals do not affect the visible image. The encoded secondary signals only affect the visible image if the television is sufficiently out of alignment to display a portion of the overscan region, and even then the presence of the secondary signals results only in a somewhat fuzzy or distorted image on the extreme edge of the television screen. Yet, by encoding the secondary signals within the overscan portion, it is assured that the secondary signals do not corrupt any portion of the television signal used by network or cable broadcasters. Hence, a television signal having secondary audio signals encoded within the overscan portion can be safely broadcast, and is therefore not limited only to playback from a prerecorded video cassette.

Thus, the secondary signals are stored within overscan portions of the visible signal lines. No secondary signals are stored within the vertical blanking lines. Furthermore, no secondary signals are encoded within the lines typically restricted by network and cable broadcasters. To prevent any 60-cycle hum or other sound distortion from occurring as a result of the skipped lines, the secondary audio signal is first sampled at equally spaced intervals throughout a corresponding video frame at a rate corresponding to the number of lines to be encoded within the frame. Then, the audio samples are encoded in only the non-skipped lines. Thus, the audio signal corresponding to the time period of an entire frame of video is compressed into only a portion of the lines of the video image. During decoding, the audio samples are extracted from those lines then decompressed for audio playback. In this manner secondary audio samples are provided during playback at equal time intervals throughout the display of the corresponding video frame. Accordingly, no substantial gaps exist between the audio samples and no 60-cycle hum occurs.

In one exemplary embodiment, the foregoing is achieved by providing a method for encoding secondary information within a television signal having overscan portion. The method comprises the steps of selecting horizontal lines to be encoded with the secondary information, sampling the secondary information at a rate related to the number of horizontal lines to be encoded, and encoding the sampled audio information in the selected horizontal lines of the television signal with the overscan portion thereof. The audio information is encoded by amplitude modulation. Other exemplary embodiments of the invention are described herein.

By encoding secondary signals within only the overscan portion of selected lines of the horizontal signal, the objectives set forth above are achieved. In particular, the television signal having the encoded secondary signals is compatible with cable and broadcast systems. Moreover, by uniformly sampling the secondary signals, then compressing the signals during encoding and decompressing the signals during decoding, the 60-cycle hum problems described above are avoided. Other advantages and applications of the invention will be described below or will be apparent therefrom. Furthermore, although principles of the invention are advantageously employed for storing secondary signals, such as audio signals, within a television signal, principles of the invention may be employed for other applications and in other systems.

DETAILED DESCRIPTION OF EXEMPLARY EMBODIMENTS OF THE INVENTION

Figure 1:
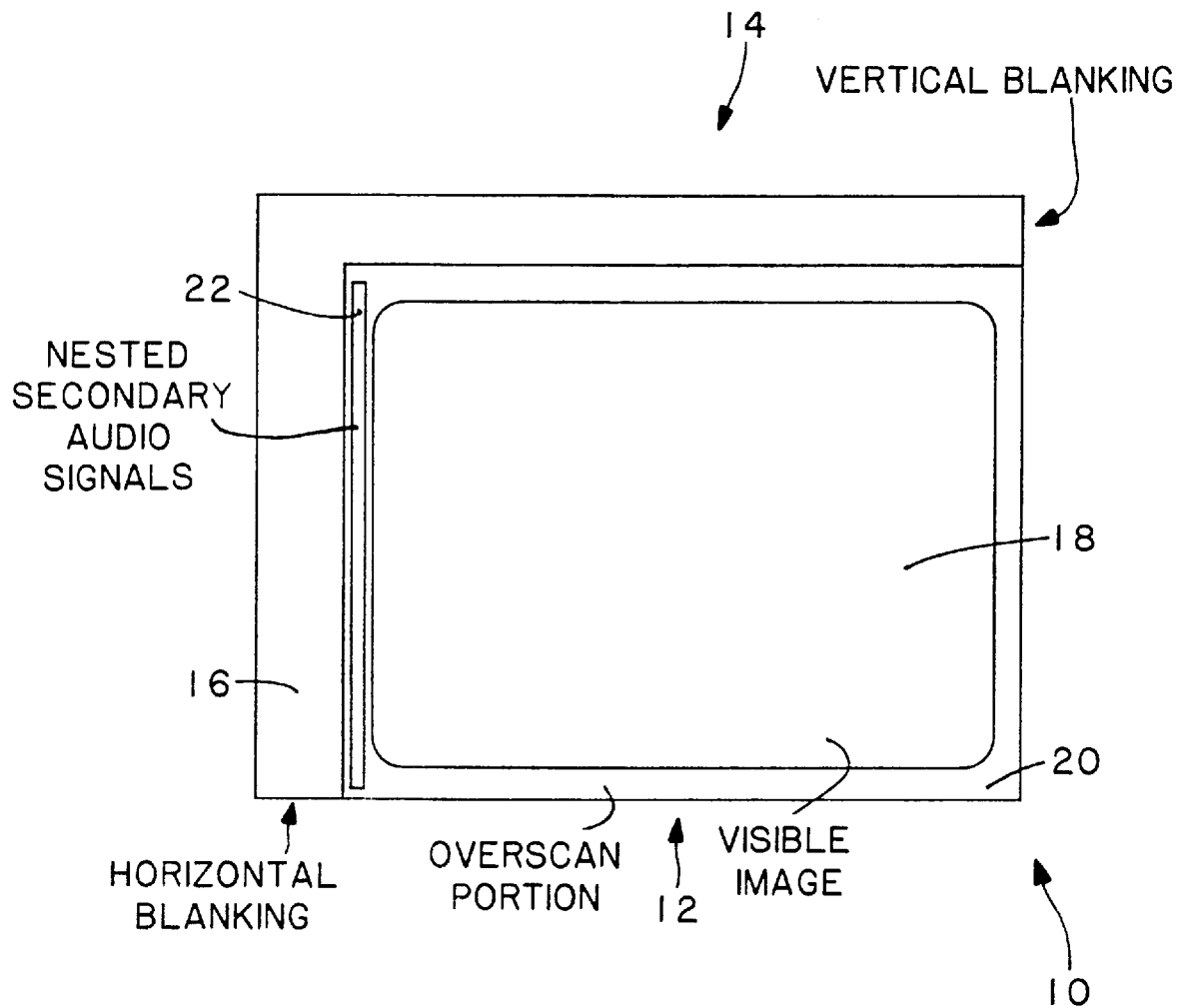
FIG. 1 is a graphic illustrating a complete frame of a television signal, particularly identifying visible and non-visible portions of the television signal.

Referring to FIGS. 1–6 exemplary embodiments of the invention will now be described. FIG. 1 is a graphical illustration of a single frame 10 of a television signal. Frame 10 includes a video image portion 12, a vertical blanking portion 14 and a horizontal blanking portion 16. The vertical blanking portion and horizontal blanking portion represent signals which are not displayed. Video image portion 12 itself includes a visible image 18 and an overscan portion 20. Visible image 18 represents a portion of the video image which is actually displayed on a properly tuned and calibrated television screen. Overscan portion 20 represents a portion of the video image which is not ordinarily displayed on a properly calibrated television set. The actual size of the overscan portion typically varies among different television sets. However, for conventional television sets, at least a minimal overscan portion is always provided.

In accordance with one aspect of the invention, secondary audio signals 22 are encoded within overscan portion 20. In particular, the secondary audio signals are encoded within the overscan portion between the horizontal blanking portion and the visible image portion of the video frame. By encoding the secondary audio samples within the overscan portion, the samples do not interfere with or corrupt control portions of the vertical or horizontal intervals. Furthermore, the secondary audio signals do not affect the actual visible image, except for television sets which are poorly tuned or calibrated such that a portion of the overscan is displayed. In such cases, some distortion or blurring of the image on the left hand portion of the television screen may be apparent.

As will be described in detail below, the secondary audio samples are compressed during encoding and decompressed during decoding to provide equally spaced audio samples throughout the television frame such that no 60-cycle hum or related distortion occurs. Also, it should be noted that in a preferred embodiment, the secondary audio samples are not stored within the overscan portion of all horizontal lines of the video image. Rather the secondary audio samples are encoded only in lines which are not subject to network or cable restrictions and which do not coincide with head switching or vertical synchronization locations. Also, it should be noted that FIG. 1 merely provides a simplified graphical illustration of a television signal frame. An actual composite television signal for providing an entire television image frame is typically split into odd and even fields with the lines of the fields provided with control and synchronization portions which are not specifically illustrated. Details of actual composite video signals will be described below or will be apparent to those skilled in the art.

Figure 2:
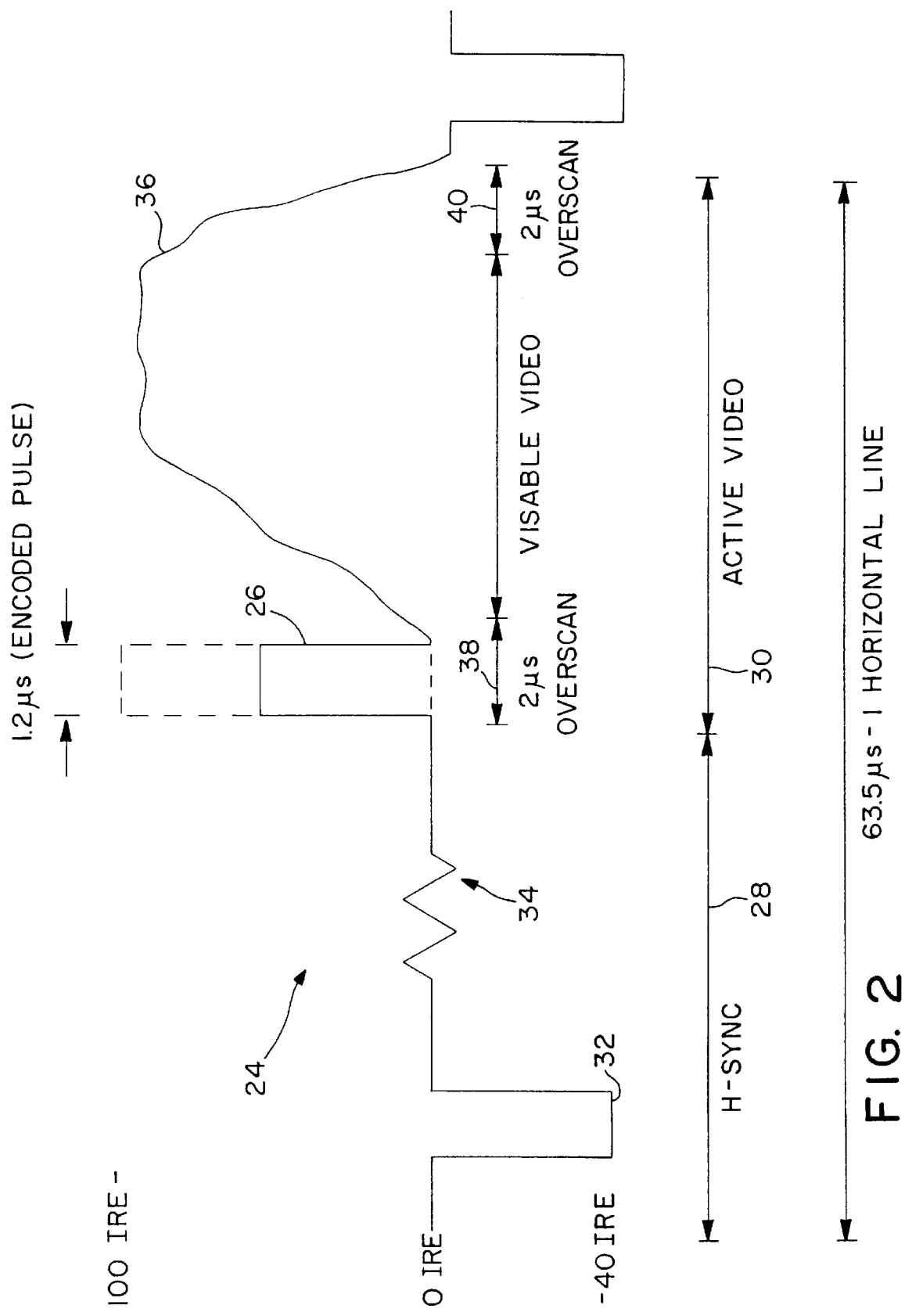
FIG. 2 is a graph illustrating a portion of a single line of a television signal encoded with a secondary audio signal.

FIG. 2 illustrates an exemplary horizontal line 24 having a secondary audio sample 26. Horizontal line 24 is graphically illustrated as voltage, on the IRE (Institute of Ratio Engineers) scale, as a function of time. Line 24 includes a horizontal sync portion 28 and an active video portion 30. Horizontal sync portion 28 includes a horizontal blanking interval 32 having a voltage of −40 IRE. Horizontal sync portion 28 also includes synchronization signals generally represented by 34. Active video portion 30 includes a visible video portion 36 and left and right overscan portions 38 and 40. Secondary audio sample 26 is encoded within left overscan portion 38. The entire horizontal line illustrated in FIG. 2 has a "length" of 63.5 microseconds ($\mu s$). Each overscan portion has a length of about 2 $\mu s$ with the secondary audio sample encoded within the first 1.2 $\mu s$ of overscan portion 38.

The amplitude of signal 24 within sample 26 is encoded to represent the amplitude of a single sample of the secondary audio signal being encoded. In one embodiment the amplitude of the secondary audio sample varies from 7.5–100 IRE. However, alternative amplitude scales may be employed. Furthermore, in the example illustrated in FIG. 2 only a single sample is encoded within overscan portion 38. In alternative embodiments, two or more audio sample points could be encoded therein. In other alternative embodiments, the trailing overscan portion 40 could also be employed for encoding secondary audio samples. However, the embodiment having only a single audio sample within just the leading overscan portion is desirable as such allows a comparatively simple apparatus to perform the encoding and decoding of the audio samples. The use of two or more samples per overscan portion or the use of both the leading and trailing overscan portions could require a more complicated encoding and decoding apparatus, although such systems would allow for a higher resolution of the secondary audio signal.

In the exemplary embodiment thus far described, the secondary signals have been described as being secondary audio signals. In alternative implementations, the secondary signals may provide other information rather than audio information, and may, for example provide only control signals for controlling a device receiving and decoding the secondary signals.

Thus, FIG. 2 illustrates an exemplary horizontal line having an encoded secondary data sample. As noted, not all horizontal lines are provided with data samples. In a preferred embodiment, only lines 22–257 and 285–520 are provided with secondary signal samples. Lines 1–9 and 263–271 provide vertical synchronization signals which may be corrupted by the presence of the secondary signal. Lines 10–21 and 272–284 are employed by broadcast and cable operators as dedicated non-program lines for encoding control signals and the like. The presence of secondary signal samples within the dedicated lines could result in corruption of the dedicated signals provided therein. Lines 258–262 and 520–525 are typically employed as head-switching locations within VCR's. Accordingly, secondary signal samples encoded therein might not be properly decoded and indeed may hinder proper head switching. Thus, only lines 22–257 and 285–520 are preferably employed for storing secondary signal samples. Of these lines, lines 22 and 23 and 285 and 286 are employed for encoding control bits, described below. Accordingly, lines 24–257 and lines 287–520, totaling 468 lines, are used for encoding audio signals samples.

Thus, only selected lines are employed for storing audio samples. If secondary audio samples were merely stored within those lines without time compression and decoded without decompression, a resulting secondary audio signal would likely have a 60-cycle hum resulting from gaps between audio samples as a result of the skipped lines. To avoid the 60-cycle hum, the method and apparatus of the invention compresses equally spaced audio samples during encoding and decompresses the audio samples during decoding to provide a continuous audio output unaffected by discontinuities.

Figure 3A:
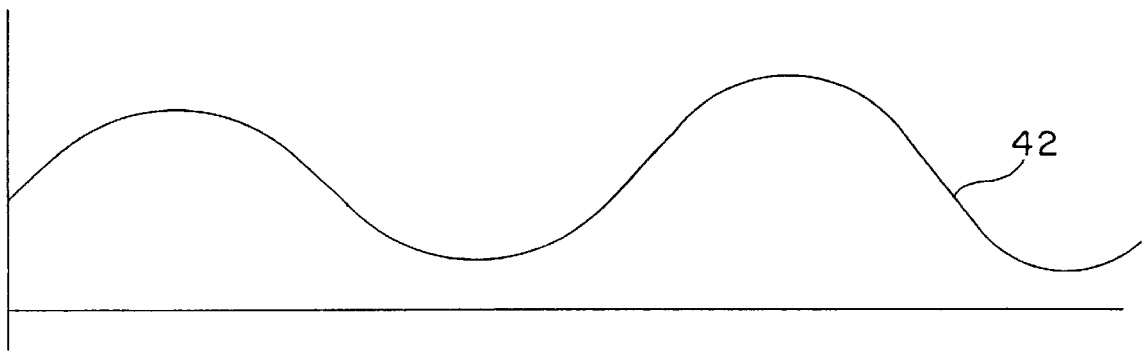
FIG. 3 is a sequence of graphs illustrating the sampling and compression of audio signals in accordance with the invention.
Figure 3B:
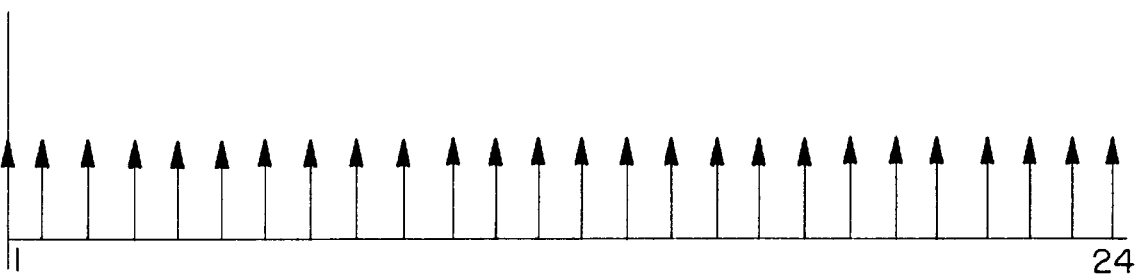
Figure 3C:
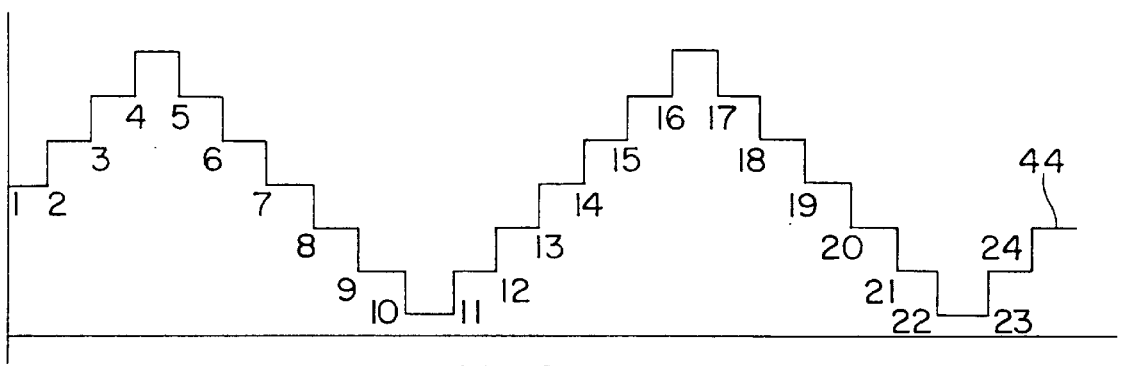
Figure 3D:
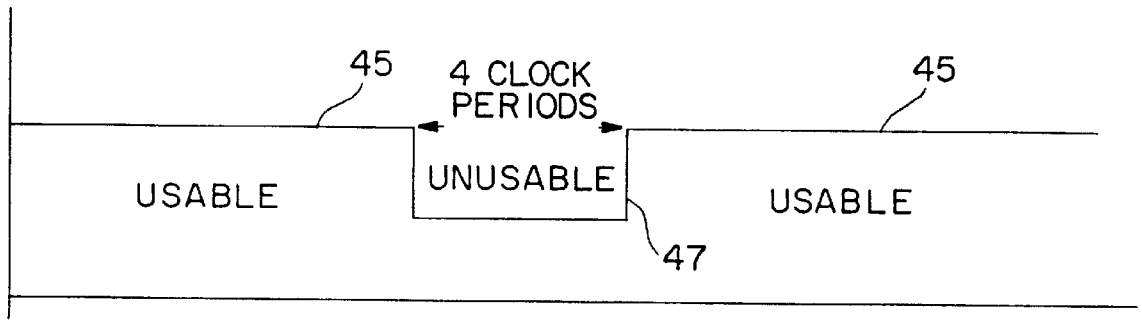
Figure 3E:
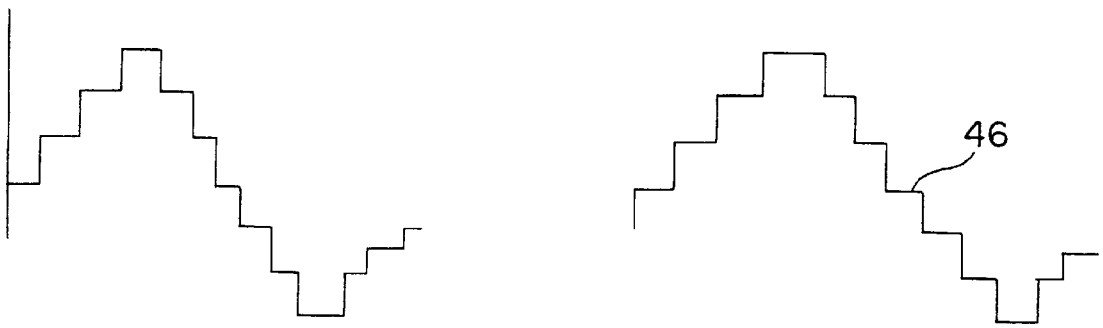
Figure 3F:
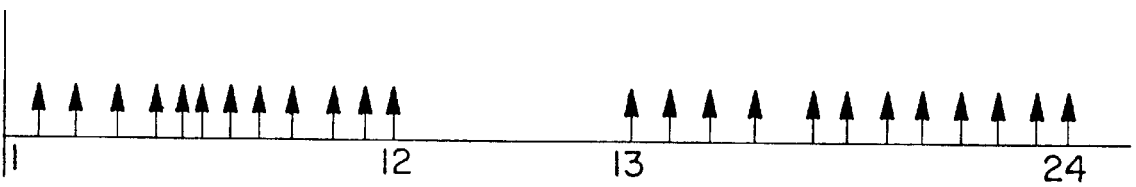

FIGS. 3A–3F illustrate an exemplary audio signal 42 in various stages of processing. More specifically, FIG. 3A illustrates an input analog secondary audio signal 42. FIG. 3B illustrates sampling points for sampling signal 42. A total of 24 sampling points are illustrated. FIG. 3C illustrates a resulting sampled digital signal 44. FIG. 3D illustrates usable 45 and unusable 47 portions of the corresponding video signal. The unusable portion represents, for example, head switching lines. To avoid the unusable portion, the digital audio signal is compressed within only the usable portions, as illustrated in FIG. 3E. No samples are lost or discarded. Rather, the time spacing between the samples is compressed to allow the entire number of original samples to be stored within only the usable portions of the video signal. FIG. 3F shows sampling points within the usable portions of the video signal. A similar sequence of steps are performed during decoding to decompress signal 46 to yield a continuous digital representation of input analog signal 42.

It should be noted that FIGS. 3A–3F illustrate only an exemplary audio signal having 24 digital sampling points and an exemplary video signal having only a single unusable portion. In the preferred implementation, as many as 468 audio samples may be stored in a manner which avoids several unusable portions of the television signal.

Figure 4:
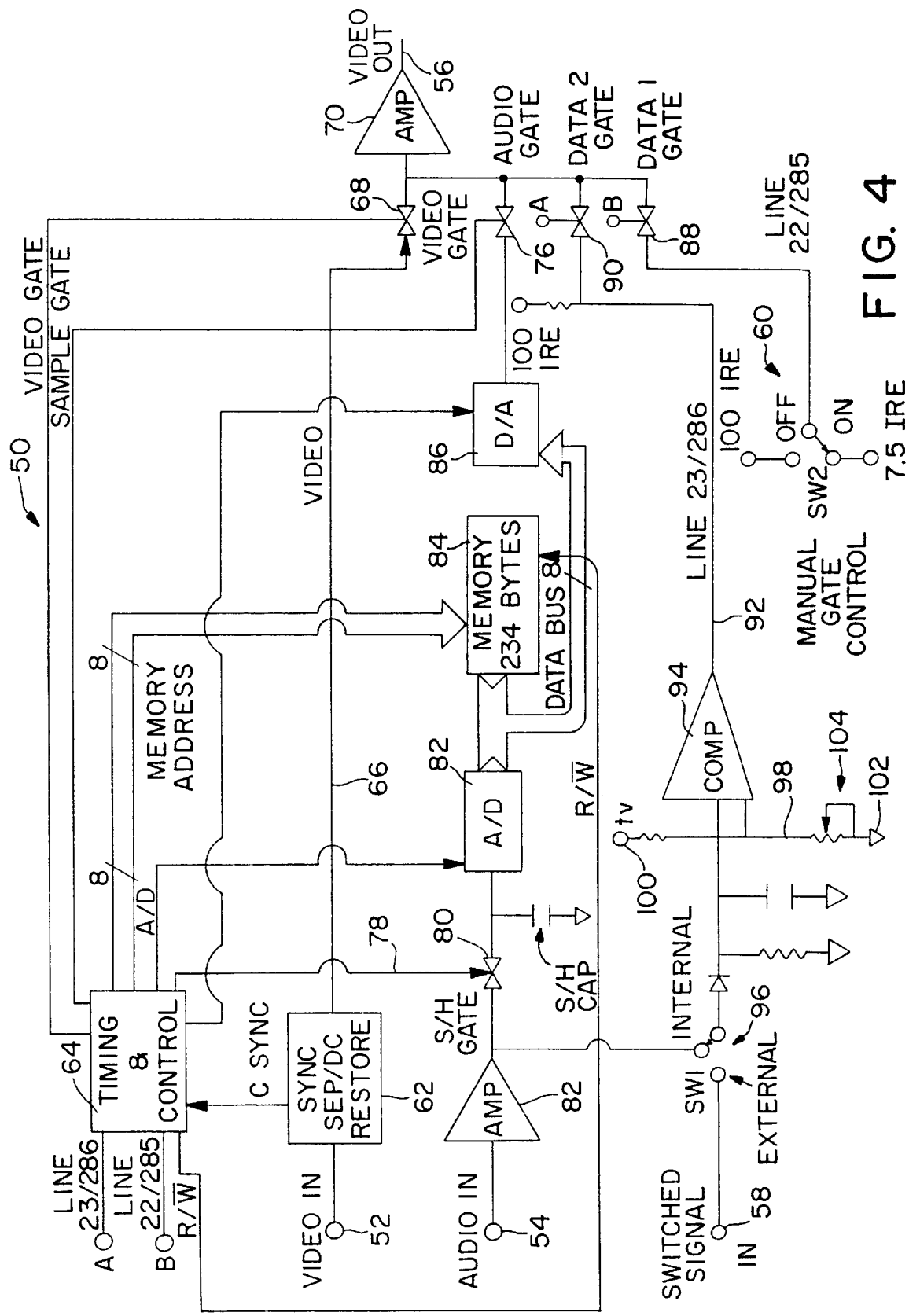
FIG. 4 is a block diagram, partially in schematic form, illustrating an apparatus for encoding audio signals onto a television signal.

FIG. 4 is a block diagram of an encoder 50 employed for receiving a television signal and a secondary audio signal and for compressing and encoding the secondary audio signal into the television signal. Encoder 50 receives a television signal, in NSTC format, through video input terminal 52 and a secondary audio signal through audio input terminal 54. Encoder 50 outputs the television signal with encoded secondary audio samples trough output terminal 56. Encoder 50 may also receive a switched input signal through input terminal 58 and a manual gate control signal from manual switch 60. The switch signal received through terminal 58 and a manual gate control signal provided by switch 60 are provided for defining control bits for encoding within the output television signal which define whether corresponding horizontal lines contain valid audio samples. Such will be described in detail below.

The video input signal received through terminal 52 is processed by a synchronization separation and DC restore block 62 which outputs a composite synchronization signal to a timing and control block 64. Block 62 also outputs the video signal along line 66 to a video gate 68 for further transmission through an output amplifier 70 onto video output terminal 56. Video gate 68 is open at all times other than when secondary signals are encoded onto the video signal. The video signal is deactivated for a period of time while secondary signals are added, thus preventing a superposition of the video signal and the secondary signal.

Figure 5:
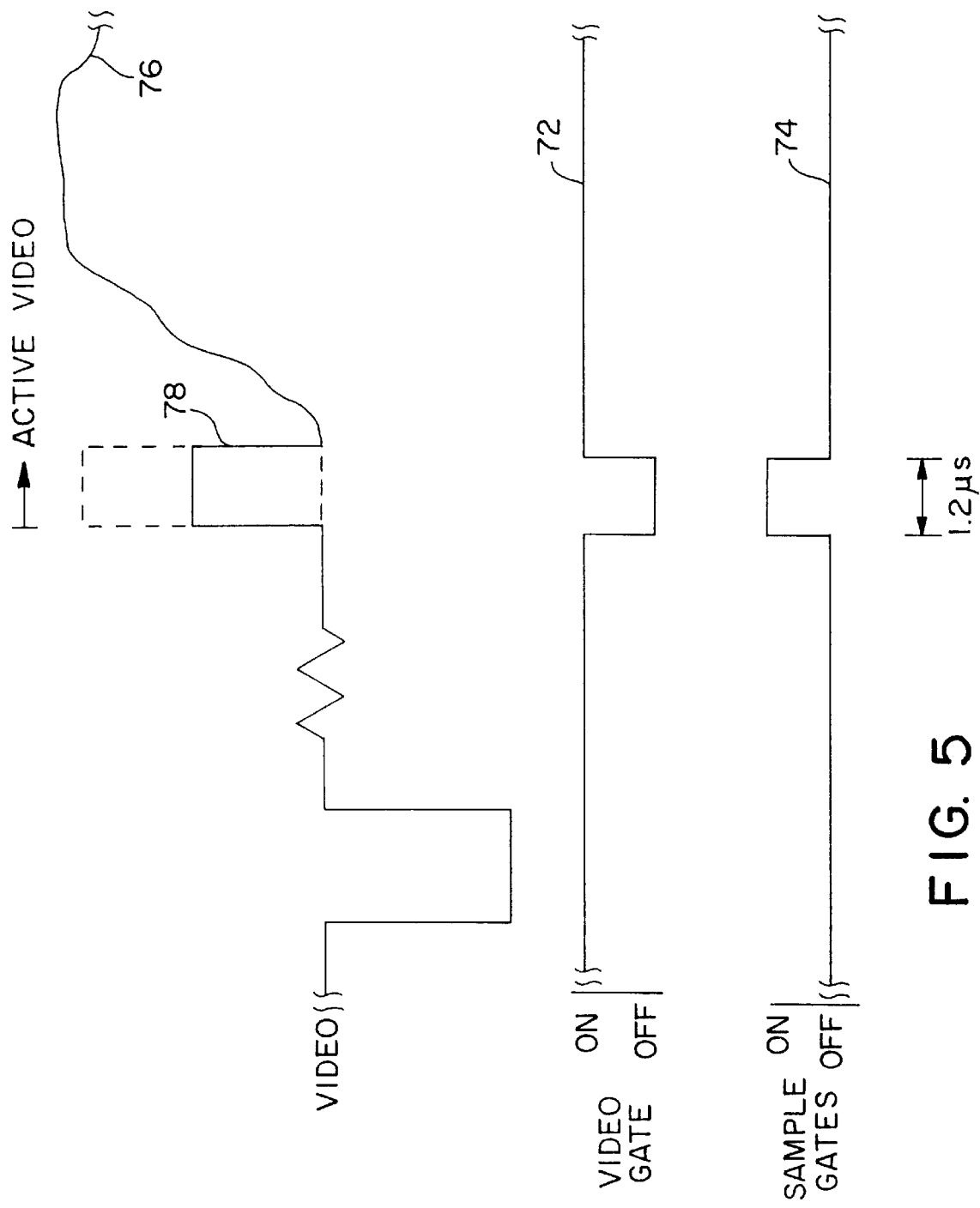
FIG. 5 is a graph illustrating a portion of a single line of a video signal, also illustrating video gate and sample gate signals employed during encoding.

Video gate 68 is controlled by a video gate control signal 72 provided by timing and control block 64. FIG. 5 illustrates video gate control signal 72. FIG. 5 also illustrates a sample gate signal 74 which controls an audio gate 76 (FIG. 4) which provides sampled audio signals. As can be seen from FIG. 5, the video gate and sample gate signals are mutually exclusive, with the video gate signal being off only while the sample gate signal is on. In this manner, audio samples are encoded only during a time period when the video signal is disconnected from the output. FIG. 5 also illustrates an exemplary portion of the video output signal 77 having an encoded audio sample 79.

Returning to FIG. 4, the manner by which the audio signals are sampled and the video gate and sample gate signals are generated will now be described. As noted, timing and control block 64 receives the composite synchronization signal. Timing and control block 64 is preprogrammed or pre-configured with information representing the number of audio samples to be encoded within each frame of the output video signal. Timing and control block 64 employs that information to output an audio sampling pulse along line 78 to control a sample and hold gate 80 for sampling the audio signal received from terminal 54 through amplifier 82. As an example, if encoder 50 is configured to encode 234 audio samples within a field displayed for 1/60th of a second, timing and control block 64 outputs pulses at a rate of 234 divided by 60 or 71.2 microseconds. Hence, sample and hold gate 80 is periodically opened every 71.2 microseconds to sample the audio input signal. The sampled audio signals received through gate 80 are converted to digital bytes by an analog-to-digital (A/D) converter 82 for storage within a memory 84. In an exemplary implementation, memory 84 is capable of storing 234 bytes, although other memory sizes may be employed. In this manner, 234 equally spaced audio samples are detected and stored in memory 84. The audio samples are equally spaced throughout the entire time period defined by the first field of the input video frame. This is in contrast to some prior art systems which sample a secondary audio signal only during portions of each video frame resulting in gaps or discontinuities in an output audio signal and thereby resulting in sound distortion including the above-described 60-cycle hum.

Thus, the secondary audio signal samples are converted to digital format and stored in memory 84. It should be noted that encoder 50 begins sampling the audio signal immediately within the video frame, even though the audio samples are not encoded into the video frame until after at least the twenty-second horizontal line is received.

The encoding of the stored audio samples onto the output video signal is controlled by timing and control block 64. Initially, timing and control block 64 locates the horizontal lines wherein the audio samples are to be encoded. More specifically, timing and control block 64 locates line 24 and outputs appropriate sample gate and video gate control signals during the overscan portion of line 24 to encode of an audio sample therein. Simultaneously, tiring and control block 64 outputs a read signal to memory 84 for outputting the first audio sample along a data bus to a D/A converter 86 for subsequent transmission of the analog audio sample through audio gate 76 and onto the video signal output through video out 56. Timing and control block 64 also outputs the memory address corresponding to the first analog sample to memory 84. In practice, timing and control block 64 may need to transmit the memory address and read signal to memory 84 somewhat in advance of the overscan period to allow time for the audio sample to be output from memory 84, converted to analog by D/A converter 86, and applied to audio gate 76.

In this manner, the first audio sample is encoded on the output video signal during the overscan period of the 24th horizontal line. To encode the remaining samples of the first field, timing and control block 64 periodically outputs additionally read signals and corresponding memory address signals to memory 84 while also controlling the video gate and sample gate signals to encode a total of 234 audio samples with horizontal lines beginning at line 24. To encode the remaining 234 samples within the second field, tiling and control block 64 locates horizontal line number 287 and provides the appropriate read, memory address signals, video gate and sample gate signals for encoding the remaining 234 audio samples on consecutive horizontal lines beginning with line 287.

Thus, a total of 468 secondary audio samples are encoded onto the output video signal within each frame of the video signal. If desired, encoder 50 can be configured to encode more or fewer audio samples.

Thus, timing and control block 64 operates to locate horizontal lines 24 and 287 for use in encoding audio sample beginning at those lines. Timing and control block 64 also locates other lines within the video frame for use in encoding control bits. In particular, control bits are encoded at lines 22 and 23 and 285 and 286. Horizontal lines 22 and 285 receive a manually setable control bit which indicates the presence of valid audio samples. The value of the manually setable bit is controlled by setting manual gate control 60 to either an on position, as shown, or to an off position. In the on position, manual gate control 60 is connected to a source which provides a 7.5 IRE signal to a first control bit data gate 88, also labeled data 1 gate. Gate 88 receives a signal from timing and control block 64 only during the appropriate overscan period of the 22nd and 285th horizontal lines. Thus, when the manual gate control is set to the on position, a control bit level of 7.5 IRE is encoded within the overscan portion of horizontal lines 22 and 285. As will be described below, a decoder (which receives the encoded video signal) detects the signal value within lines 22 and 285 and plays back the sampled audio signals only if an IRE value of 7.5 is encoded therein. To indicate invalid audio sample data, manual gate control 60 is manually switched to an off position which provides a signal of 100 IRE to gate 88 for encoding onto lines 22 and 285. The signal value level of 100 IRE provides an indication to the decoder that the secondary audio signals are invalid. Accordingly, the decoder ignores any audio samples encoded within the overscan portions. In this manner, the playback of secondary audio signals can be manually disabled during encoding. The manual gate control is advantageously employed to ensure that secondary audio signals are not extracted from the video signal, for example, during the broadcast of commercials rather than program material.

A second control bit is provided within lines 23 and 286. The second control bit is applied to the video signal through a second control gate 90 which receives enabling signals from timing and control block 64 only during selected overscan portions of horizontal lines 23 and 286. Gate 90, also labeled data 2 gate within FIG. 4, receives input signals along line 92 from a comparator 94 which has a first input connected through a switch 96 to either amplifier 82 or switched signal input terminal 58. With switch 96 set to an internal mode, an audio signal output by amplifier 82 is applied to the first input of comparator 94. A second input of comparitor 94 is connected along a line 98 interconnecting a voltage source 100 and a ground 102 through a variable resistor 104. The variable resistor 104 is used to select the level of audio input that causes comparator 94 to go high with an audio signal input thereto. In his manner, an audio threshold can be set to a level above any inherent noise level.

As interconnected, comparator 94 provides an active high signal if an audio signal is present and if switch 96 is set to the internal mode. Comparator 94 provides an inactive low signal if no audio signal is present while switch 96 is connected to the internal mode. Hence, a control bit is encoded within the 23rd and 286th lines which indicate whether an audio signal is present. Thus, if no secondary audio signal is input, the lack of the audio signal is represented by the second control bit. The decoder (not shown in FIG. 4) examines the second control bit prior to decoding the samples stored within the overscan portions of the horizontal lines.

With switch 96 set to the external position, the value of the second control bit is controlled by a input switch signal received by terminal 58. The external position provides for leading and lagging of the active audio signal. More specifically, a control signal indicating the presence of audio samples may be set within a video field which is several fields in advance of an initial field containing actual audio samples. This function allows the decoder, described below, to turn itself on slightly before a valid audio signal is present to thereby allow a "soft" turn on of the audio output of the decoder. The soft turn on eliminates gate switching noise which may occur if the decoder is activated or deactivated while actual secondary audio signals are present. Hence, by setting switch 96 to the external position at appropriate time, the operation of the decoder may be activated slightly before the presence of audio samples and deactivated slightly after the completion of audio samples. This helps to avoid any audible "pop" within the audio signal output by the decoder.

Thus, lines 22, 23, 285 and 286 receive control bits which identify the validity of audio samples encoded. In the foregoing, for clarity, the encoding of the audio samples was described before the encoding of the control bits. In operation, the control bits of lines 22 and 23 are encoded prior to the audio samples beginning at line 24. Likewise, the control bits of lines 285 and 286 are encoded prior to the audio samples beginning at line 287.

The above-described process for encoding control bits and audio samples within a single video frame is repeated for each consecutive video frame, until, for example, an entire television program is encoded with audio signals, perhaps for use with the interactive teddy bear or toys of the type described above.

Figure 6:
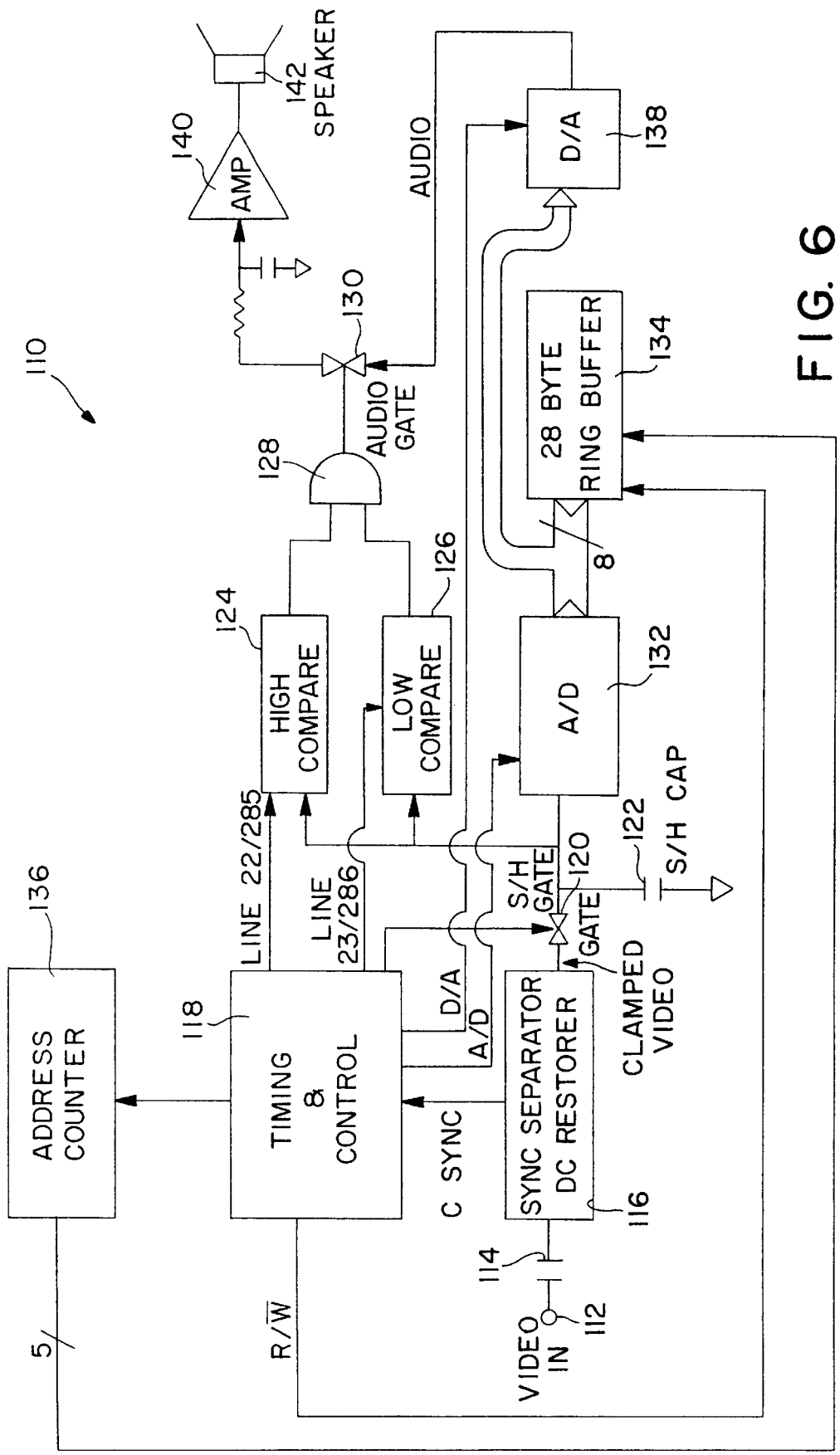
FIG. 6 is a block diagram, partially in schematic form, illustrating an apparatus for decoding television signals encoded by the apparatus of FIG. 4.

Referring to FIG. 6, the operation of a decoder 110 for extracting the control bits and audio samples from an encoded video signal will now be described. Decoder 110 receives the encoded television signal through a video input terminal 112. The video input signal is applied through a capacitor 114 to a synchronization separator and DC restore block 116. Block 116 outputs a composite synchronization signal to a timing and control block 118 and also outputs a clamped video signal to a sample and hold gate 120. Sample and hold gate 120 is controlled by timing and control block 118 to transmit portions of the video input signal only during the predetermined overscan portion of the selected horizontal lines. More specifically, timing and control block 118 locates line 22 within the video input signal and transmits an enabling signal to gate 120 to allow the control bit provided within line 22 to be passed therethrough. Sample and hold gate 120 thereby outputs a signal for charging sample and hold capacitor 122 to a value representative of the encoded pulse on line 22. The resulting signal is applied to a high comparison block 124 where it is latched therein. High compare block 124 also receives a latch enable signal from timing and control block 118. Next, timing and control block 118 locates line 23 and applies a signal to gate 120 causing the control bit encoded therein to be applied to low compare block 126. Low compare block 126 also receives a latch enable signal from timing control block 118. The outputs of the high and low compare blocks are then applied to an AND gate 128, the output of which is applied to an audio gate 130 for activating audio output. In this manner, audio gate 130 is opened only if the control bits of lines 22 and 23 are both high. A low bit in either or both of lines 22 and 23 prevents the opening of audio gate 130 and thereby prevents the secondary audio signals from being played back.

Timing and control block 118 also locates line 24 and applies a signal to gate 120 for transmitting an audio sample pulse therethrough to an A/D converter 132. The audio sample of line 24 is digitized then stored within a twenty-eight line ring buffer 134. Immediately upon sampling line 24, timing and control block 118 also begins outputting data from buffer 134 in first-in/first-out (FIFO) fashion. Data output from buffer 134 is identified by an address provided by timing and control block 118 through address counter 136. The bytes output from buffer 134 are transmitted to a D/A converter 138. A resulting analog audio signal is transmitted through audio gate 130 to an output amplifier 140 for playback on a speaker 142. As noted above, audio gate 130 is only open if high signal values are encoded within the control bits of both lines 22 and 23.

The process of sampling the video input signal, storing the samples within ring buffer 134, and outputting data from ring buffer 134 proceeds throughout the first field of the input video frame. The process repeats for the second field with timing and control block 118 locating lines 185, 186 and 187 and applying appropriate control signals to gate 120 and to high and low compare blocks 124 and 126.

It should be noted that the timing for reading from buffer 134 and writing to buffer 134 is asynchronous. The write timing is based on a horizontal synchronization timing of 63.5 microseconds. The read timing is based on the audio sampling timing of 71.2 microseconds. Based this timing, when all 234 samples of a single field have been digitized into memory, 27 bytes of data remain to be clocked out over the remaining 30 scan lines. In this manner, the ring buffer is completely empty when the first audio byte of the next field is ready to be sampled.

By employing a ring buffer, the audio samples which are compressed within only the selected lines of the input video frame are decompressed during playback. Hence, the audio playback provides equally spaced audio samples through the video frame, rather than compressed audio samples during only a portion of the video frame. As noted, by providing equally-spaced audio playback samples, audio distortion such as 60-cycle hum is eliminated.

Thus, all 468 audio samples corresponding to an entire video frame are decompressed and played back during a time period equal to the length of the video frame. It should be noted, however, that the playback of the first audio sample does not begin until after timing and control block 118 identifies line 24. As such, the output of the audio samples is delayed or skewed from the input video signal by at least a time period equal to the first 23 lines of the video frame. To compensate for this encoding delay or skew, the synchronization of the audio source can be advanced by 28 lines during encoding to achieve exact alignment. However, the synchronization skew is very small (about 1.78 $\mu$s) and therefore can be ignored for most applications.

Appendix A provides circuit schematics for an exemplary embodiment of the encoded and decoder.

In the exemplary system thus far described, control bits are employed only to indicate the presence or absence of valid audio signals. Additional control signals may be employed, for example, to select between two tracks of audio signals, perhaps corresponding to two characters within a television program. As another example, further control bits can be employed for identifying the location of the audio samples within the video signal. For example, a control bit may indicate whether the samples are stored within the leading overscan portion or the trailing overscan portion of each horizontal line. As can be appreciated, a wide range of features may be exploited with the appropriate choise of control bits and encoding schemes. Furthermore, the system need not be employed only for encoding audio signals but may encode any form of secondary information. Including, for example, textural information encoded and digital format.

What has been described is a method and apparatus for encoding secondary signals, such as audio signals, within a television signal in a manner such that the signal may be either recorded on a video cassette or broadcast. The audio samples are encoded only on selected lines which do not interfere with dedicated broadcast and cable lines and are not affected by head switching of a video cassette recorder. The secondary audio signal is sampled during equally spaced intervals throughout a video frame, then compressed and encoded only within selected horizontal lines. During decoding, the audio samples are decompressed and played back at the original sampling rate to provide an audio playback which is unaffected by the audio distortion which can occur in prior art techniques as a result of gaps or discontinuities within the audio signal. Although the invention has been primarily described with respect to the encoding and decoding of a secondary audio signal, principles of the invention may be employed for encoding or decoding any type of information within an NTSC television signal and may be further applied to other types of signals as well such as PAL and Secan, and to non-television signals. Likewise, although the invention is advantageously employed for encoding audio signals for use with an interactive teddy bear or toy, a wide range of other applications may be employed. Hence, the exemplary embodiments described herein are merely illustrative of principles of the invention and should not be taken as limiting the scope of the invention.

I claim:

1. A method of transmitting secondary information having a digital format within a television signal, the method comprising:

selecting a first plurality of scan lines to be encoded with control information and the secondary information;

producing samples of the secondary information by sampling the secondary information at a predetermined rate; and encoding overscan portions of active video regions of the first plurality of scan lines with the control information and a plurality of the samples, the control information indicating that the plurality of the samples are present in the first plurality of scan lines, the first plurality of scan lines being encoded with the samples at a temporally compressed rate within the overscan portions of the active video regions.

2. A method of recovering secondary information encoded as a plurality of samples within a television signal that produces successive fields, each having a first plurality of scan lines within a respective field time, the method comprising:

receiving the television signal containing the secondary information having a digital format; and for a field, selecting a second plurality of scan lines among the first plurality of scan lines, the second plurality of scan lines being associated with a visible image of that field, decoding an overscan portion of an active video region of the second plurality of scan lines to obtain control information, and examining the control information to identify whether an overscan portion of one of the active video regions of the second plurality of scan lines further includes the plurality of samples.

3. The method of claim 1 further comprising:

transmitting the television signal containing the secondary information and the control information.

4. The method of claim 1, wherein the selecting of the first plurality of scan lines includes providing the television signal having successive fields, each field having a second plurality of scan lines being a superset of the first plurality of scan lines;

ascertaining scan lines of the second plurality of scan lines reserved for network of cable operations and head switching locations; and excluding the scan lines from the second plurality of scan lines before selecting the first plurality of scan lines.

5. The method of claim 1, wherein when the plurality of samples are encoded at the temporally compressed rate, a time spacing between each sample of the plurality of samples is less than a time spacing between the sample of the plurality of samples taken at the predetermined rate.

6. The method of claim 1 further comprising:

receiving the television signal containing the secondary information;

extracting the plurality of samples from the first plurality of scan lines; and temporally decompressing the plurality of samples so that each sample containing the secondary information is output at a rate generally equal to the predetermined rate and are separated by substantially equal spaced time intervals.

7. The method of claim 1, wherein the encoding includes (i) ascertaining the overscan portion of each active video region of the first plurality of scan lines and (ii) encoding the overscan portions of at least two of the first plurality of scan lines with the control information.

8. The method of claim 1, wherein the control information indicates whether the overscan portion of the active video regions of the first plurality of scan lines is encoded with the secondary information.

9. The method of claim 8, wherein the control information further indicates whether the secondary information contained in the overscan portions of the active video regions is valid.

10. The method of claim 1, wherein the control information includes at least one control bit to indicate whether the overscan portions of the active video regions are encoded with the secondary information.

11. The method of claim 10, whether the control information further includes at least one control bit to indicate whether the secondary information is valid.

12. The method of claim 2 further comprising:

decoding the overscan portions of active video regions of the second plurality of scan lines to extract the plurality of samples; and successively outputting the samples at a uniform rate throughout the entire frame time.

13. The method of claim 12, wherein successively outputting the extracted samples is performed so that the extracted samples are output in a continuous manner and are at substantially equally spaced time intervals from each other.

14. The method of claim 12, wherein prior to successively outputting the extracted samples, the method further comprising examining the control information to determine whether the samples in the active video regions of the encoded television signal are valid.

15. The method of claim 2 further comprising examining the control information to identify whether the secondary information is valid.

16. The method of claim 2, wherein the control information includes at least one control bit to indicate whether at least the one of the overscan portions of the active video regions is encoded with the secondary information.

17. The method of claim 16, wherein the control information further includes at least one control bit to indicate whether the secondary information is valid.

18. In a video cassette prerecorded with video information and secondary information encoded in a format adaptive for a video cassette recorder transmits the information signal to display successive frames of a video image, including an overscan portion not visible from a properly calibrated monitor device, every respective frame time, the information signal associated with the display of each frame comprising:

a first segment including vertical blanking signals; and a second segment including (i) horizontal blanking signals, (ii) control signals contained within a part of the information signal associated with the overscan portion to indicate whether the information signal provides valid information, and (iii) video signals which produce a displayed portion of the video image, wherein the information signal is encoded with the control signals and is encoded with a plurality of samples of the secondary information, equal in number to samples of the secondary information taken within the respective frame time.

19. The method of claim 16, wherein the control information is retrieved during decoding.

* * * * *